United States Patent

[11] 3,609,128

[72] Inventor Iral B. Johns
Marblehead, Mass.
[21] Appl. No. 871,343
[22] Filed Oct. 24, 1969
[23] Division of Ser. No. 411,140, Nov. 13, 1964, Pat. No. 3,502,579, continuation-in-part of Ser. No. 324, Nov. 18, 1963, abandoned.
[45] Patented Sept. 28, 1971
[73] Assignee Monsanto Research Corporation
St. Louis, Mo.

[54] METHOD OF PRODUCING NITRILE POLYMERS
5 Claims, No Drawings
[52] U.S. Cl. .................................................. 260/78.4 N,
260/88.7 A, 260/465.7
[51] Int. Cl. .................................................. C08f 1/72,
C08f 1/76, C08f 3/74
[50] Field of Search .......................................... 260/78.4 N,
2, 85.5 N, 85.5 M, 85.5 L, 85.5 P, 88.7 A, 88.7 E,
88.7 F, 88.7 C, 88.7 G

[56] References Cited
UNITED STATES PATENTS
3,347,901 10/1697 Fritz et al. .................... 260/465.6
3,086,946 4/1963 Brown ........................... 260/2

Primary Examiner—Joseph L. Schofer
Assistant Examiner—John Kight
Attorneys—L. A. Ferris, R. M. Dickey and M. B. Moshier ABSTRACT: Method for producing polymers of nitriles, especially perfluoroglutaronitrile and acetonitrile, in the presence of catalytic materials such as, graphite, nickel chloride, metal cyanocoordination compounds, e.g., copper phthalocyanine, at elevated temperatures, and in some cases, elevated pressures.

METHOD OF PRODUCING NITRILE POLYMERS

This is a division of application Ser. No. 411,140, filed Nov. 13, 1964; now U.S. Pat. No. 3,502,579 which application is a continuation-in-part of my application Ser. No. 324,213, filed Nov. 16, 1963, now abandoned.

This invention relates to methods of polymerization and polymeric products, and more particularly, to methods of forming oligomers and high polymers of organic nitriles, to polymers of nitriles, and to the use of such polymeric products in antifriction drive train elements.

Certain polymeric products with low coefficients of friction have been found useful hitherto in the construction of equipment involving frictionally contacting, moving parts such as gears, bearings and the like. Such polymers include, for example, nylon and polymers of tetrafluoroethylene. The products comprising such polymers, however, are useful only within limited temperature ranges: the polymers soften and deform at elevated temperatures, or even fail by decomposition.

Among possible thermally stable linking bond-generating groups for polymer synthesis is the nitrile, $-C\equiv N$ group, which will condense with other nitrile groups to form chains of $-C=N-$ groups linked to one another. Compounds containing these chains of $-C=N-$ linking elements have good thermal stability. However, condensation of nitriles to form polymers and particularly, to form high molecular weight polymers is in many cases difficult, and conditions have not previously been known whereby such reactions can be accomplished smoothly and without excessive loss of starting materials to provide products of good thermal stability.

It is an object of this invention to provide improvements in the art of antifriction elements.

Another object is to provide novel methods of converting nitriles to oligomers and high polymers, and novel high polymers of nitriles.

These and other objects will become evident upon consideration of the following specification and claims.

STATEMENT OF THE INVENTION

It has now been found that the application of elevated temperatures, and in some cases, high pressures, to organic nitriles in the presence of certain catalysts forms useful oligomers and high molecular weight polymers.

In accordance with this invention, base catalysis can be employed to produce high polymers from dinitriles free of alpha hydrogen atoms such as perfluorinated dinitriles, at high pressures (above 5,000 kg./sq. cm.) and temperatures (above 200° C.). Heterogeneous catalysis with a solid catalyst such as graphite can be used to produce oligomers and high polymers from various nitriles under the stated high pressures and temperatures. Heterogeneous catalysis with certain metal halides and metal cyanocoordination compounds can be used to produce high polymers from dinitriles free of alpha hydrogen atoms at low pressure, close to atmospheric, at temperatures below 200° C., or at higher pressures.

It is further been found that the high polymers of perfluorinated dinitriles obtained by the present catalytic methods have a low coefficient of friction, are thermally stable, retain rigidity to elevated temperatures, and are excellently adapted for use in the construction of antifriction drive train elements. Depending on the method and conditions of polymerization used to make them, varying kinds of the stated novel high polymers of perfluorinated dinitriles can be produced by the novel catalytic polymerization methods of this invention, as will appear hereinafter.

USE OF BASE CATALYSTS

Employing a basic catalyst and applying high pressures and elevated temperatures in accordance with this invention, dinitriles free of alpha hydrogen atoms are converted to high polymers smoothly and conveniently.

When an alkylene dinitrile is held under very high pressures (above 5,000 kg./sq. cm.) it has been found that the dinitrile polymerizes to a dense polymer in which the repeating units have the same empirical formula as the monomeric dinitrile. However, there is usually some decomposition in the high pressure condensation of hydrocarbon alkylene dinitriles like malononitrile, succinonitrile and glutaronitrile, with liberation of ammonia. Furthermore, the resulting polymers evolve ammonia upon heating, apparently because of migration of hydrogen from the alpha carbon atoms to the nitrogen.

On the other hand, the base-catalyzed polymerization of alkylene dinitriles free of alpha hydrogen in accordance with this invention proceeds smoothly to provide valuable thermally stable polymers. Exemplary of such alkylene dinitriles free of alpha hydrogen are the perfluoro alkylene dinitriles such as perfluoroglutanitrile. When unfluorinated glutaronitrile is exposed to a temperature of 300° C. under a pressure of 7,600 kilograms per square centimeter (kg./sq. cm.), it polymerizes violently to yield a black carbonaceous mass and much ammonia. Pure perfluoroglutaronitrile resists condensation by elevated temperatures and pressures: in the absence of base, temperatures as high as 250° C. in conjunction with pressures as high as 30,000 kg./sq. cm. have scarcely any effect on the perfluorinated dinitrile. On the other hand, with trace catalytic amounts of a nitrogenous base such as ammonia or an amine such as diethylamine, polymerization proceeds smoothly and rapidly in the 5,000–25,000 kg./sq cm. range without observable heat evolution. The condensation is easily controlled and proceeds in gradual stages, during which the reaction mass passes from a thick sticky liquid to a soft rubbery solid and finally to a strong, tough, rigid solid which is stable to above 400° c.

USE OF HETEROGENEOUS CATALYSTS

The present, above-described base-catalyzed high pressure conversion of alkylene dinitriles free of alpha hydrogen atoms into high polymers is conducted in essentially a homogeneous reaction system.

It has further been found that heterogeneous catalysis can be employed to effect the conversion of nitriles into oligomers and high polymers, using solid catalysts such as graphite.

In the condensation of mononitriles, the products obtained may be oligomers, that is, low polymers of nitriles, such as cyclic trimers. For example, acetonitrile is converted to a pyrimidine. With ammonia as catalyst, to produce a 67 percent yield of pyrimidine product requires 17 hours at 6,000–7,000 kg./sq. cm., but using graphite as a catalyst at pressures of 5,000–10,000 kg./sq. cm., the condensation is complete in 15 minutes and the yield of the pyrimidine is quantitative.

Heterogeneous catalysis has also been found applicable to the condensation of nitriles to form high polymers, including the condensation of alkylene dinitriles free of alpha hydrogen atoms to high polymers. The heterogeneous catalysts (solid catalysts of heterogeneous polymerization) found active in this connection comprise graphite and certain metal salts, including metal halides and cyano compounds, as set forth hereinafter. Conditions for the heterogeneous polymerization may be high pressure, high temperature conditions as employed in base-catalyzed, homogeneous polymerization or, employing certain metal salts as catalysts, low pressure (autogeneous, close to atmospheric), low temperature (below 200° C.) conditions have been found operative, as well as the more extreme conditions.

FILLED POLYMERIC COMPOSITIONS

The catalyzed polymerization of dintriles to form high polymers in accordance with this invention inherently produces filled polymeric compositions when heterogeneous catalysis is used. It has further been discovered that the heterogeneous or homogenous polymerizations may be conducted in the presence of filler materials which are not themselves catalysts of the polymerization. Such noncatalytic fillers may advantageously be solid lubricants such as crystalline inorganic salts of the layer lattice type.

The resulting filled polymeric compositions have various advantageous properties. They are generally more rigid than the unfilled polymers, especially at elevated temperatures. The polymeric compositions filled with graphite are electrically conductive and heat-conductive; they remain rigid and stable at elevated temperatures, up to 400° C. and above. With solid lubricant fillers included, either as a catalyst, like graphite or in addition to a catalyst, filled perfluorinated dinitrile polymeric products are especially advantageously adapted for use as an antifriction material in bearings, gears or the like. These filled polymeric products, have low coefficients of friction, and in contact with moving parts, their wear is low.

ADVANTAGES OF THE INVENTION

The presently provided polymers have many advantageous properties. The high pressure polymers of alkylene dinitriles free of alpha hydrogen atoms have particularly good thermal stability. They are tough substances which are not readily susceptible to fracture and can quite easily be shaped by sawing, machining or like processes. The perfluorinated dinitrile polymers are especially advantageous because, in addition to the stated properties, they have markedly low coefficients of friction and are thus especially adapted for the construction of antifriction elements in drive train systems. These polymers are inert to attach by such fluorine compounds as gaseous fluorine and chlorine trifluoride, even at elevated temperatures. A peculiar and unique property of the perfluorinated dinitrile polymer made in the 5,000–15,000 atmosphere range in the presence of a stable free radical system in the polymer.

The filled polymeric products of the invention have several further advantages. For example, the graphite-filled polymer has enhanced heat conductivity, electrical conductivity, and increased rigidity. Thus in contrast to the usual catalytic polymerization situations, where removal of substantial amounts of residual catalyst may be desirable, the presence of a residue of a chemically inert catalyst like graphite in the polymers of this invention is actually advantageous.

The present catalytic method for the conversion of nitriles to oligomers and high polymers is advantageously easily conducted. Using the catalysts of this invention, condensations of the nitriles are effected at considerably lower pressures than those necessary to produce condensation in the absence of the catalyst. The use of high pressure in conjunction with the catalyst produces condensation of nitriles which are difficult or impossible to condense at atmospheric pressures. On the other hand, excessively high pressures are not necessary. Indeed, pressured close to atmospheric can be used to make polymers from dinitriles with certain catalysts of this invention. The catalysts employed in accordance with the invention are readily available and inexpensive materials. Base catalysis requires use of only very small amounts of catalyst. In heterogeneous catalysis of polymerization, the solid catalyst may additionally perform the function of a useful filler in the polymer afterwards, particularly where the catalyst is a solid lubricant. Where oligomers such as cyclic trimers of mononitriles are formed using graphite as a catalyst, the trimer is easily washed out of the solid catalyst.

Drive train elements made of the presently provided high polymer products are uniquely advantageous. They have the advantage of antifriction materials made of polymers: light weight, easy formation of complex shapes, self-lubrication, and so forth. On the other hand, they have the further particular advantage of being useful to a temperature range higher than that at which polymeric antifriction products can normally be employed.

THE PRODUCTS

The products of the present novel methods in which nitriles are catalytically condensed are polymers. They contain repeating units, which in the present case are of the same empirical formula as the monomeric starting material.

The term, polymer, is here used as inclusive of oligomers and higher polymers. An oligomer is a low molecular weight polymer having a molecular weight, say, of below about 1,500. Higher polymers generally exhibit the properties characteristic of resins and plastics.

In the polymeric products of the method of this invention, the repeating units of the same empirical formula may or may not have the same structure. For example, a product of compressing acetonitrile under high pressures in the presence of a catalyst in accordance with this invention is 2,6-dimethyl-4-aminopyrimidine

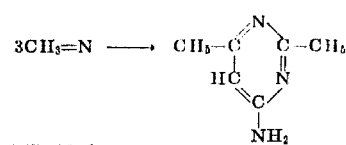

an oligomer in which one of the units of empirical formula $C_2H_3N$ is bonded through carbon atoms, $-CH=C(NH_2)-$ and the other two units, with the same empirical formula, are bonded through a divalent substituted nitrilomethylidyne bonding group formed from the nitrile radical, $-N=C(CH_3)-$. Substituted nitrilomethylidyne units can also form the exclusive bonding unit in the products, in oligomers such as triazines, of the formula

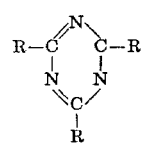

where R is the residue of the original nitrile, or higher polymers. As has been established by various researches on polymeric products derived from nitriles, such as the pyrolysis products of polyacrylonitrile, substituted nitrilomethylidyne units can be joined in a linear chain

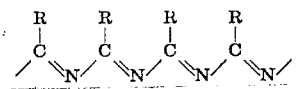

and so forth (where R again is an organic nitrile residue), and with this mode of linear polymerization, high polymers can be formed from monofunctional nitriles. Dinitriles, as will be obvious, can form high polymers either by this kind of linear chain formation or by the dinitrile residues joining rings such as triazine rings.

The nature of the products obtained may be affected by the polymerization conditions. For example, at pressures below 10,000 kg./sq. cm., acetonitrile can be converted under elevated pressures largely or entirely to the above-illustrated pyrimidine, whereas it forms a triazine at more elevated pressures, on the order of 40,000 kg./sq. cm. In the preparation of high polymers from α–H–free organic dinitriles in accordance with the present method, it has been found, unexpectedly, that the pressure applied during the polymerization significantly affects the nature of the product. A polymer made of heterogeneous catalysis at close to atmospheric pressure is spectroscopically similar to that made with the same catalyst at about 1,500 kg./sq. cm., but the polymer made at the low pressure by base catalysis (which is rubber) does appear to differ from that made by base catalysis at pressures of 500–15,000 kg./sq. cm. Further, at pressures in the range of about 5,000 to 15,000 kg./sq. cm., the solid, tough polymer formed by perfluoroglutaronitrile, having the valuable properties set forth hereinabove, is black in color. When the monomer is polymerized at higher pressure, in the range of 15,000–25,000 kg./sq. cm., the product is again a solid, tough polymer, but it is light in color and transparent. This is not merely an effect of exposure to the more elevated pressure, for subjecting the previously prepared polymer to the same conditions as those used to convert the monomer to the light-colored polymer has no effect on the black polymer. Comparison of spectra of the black high-pressure polymers with those of the transparent polymer produced at higher pressures also indicates that the polymers differ fundamentally in structure. Also, unexpectedly, the black polymer is found to contain stable free radicals. Evidence for the presence of free radicals in not obtained from either the light polymer made at higher pressures or from a polymer made at close to atmospheric pressure.

THE STARTING MATERIALS

Referring now in more detail to the practice of this invention, the present methods of catalysis with a base and heterogeneous catalyst with a solid catalyst are both applicable to the formation of high polymers from alkylene dinitriles free of alpha hydrogen atoms.

THE α–H–FREE ALKYLENE DINITRILES

The presently useful dinitriles may have an alkylene chin of 2 to 12, and preferably, 2 to 4 carbons atoms between the two nitrile groups. By an alkylene chain is meant a chain of singly bonded carbon atoms with four substituents each. The number of carbon atoms in the dinitrile may vary from 4 to 14.

The substituents on the alpha carbon atom avoiding the presence of alpha hydrogen atoms may advantageously be fluorine atoms, and the fluorine-substituted dinitriles which are difluorinated on the alpha carbon atoms are preferred in the present connection, and the perfluorinated dinitriles are particularly preferred. Hydrocarbyl radicals free of aliphatic (olefinic and acetylenic) unsaturation may be present in the monomeric dinitriles, but to avoid the possible evolution of HF from the polymer under thermal stress, it is advisable not to have hydrogen substituents on the carbon atom adjacent to the fluorinated carbon atom.

Presently contemplated monomeric dinitriles include, for example, dinitriles with two carbon atoms between the nitrile groups, such as perfluorosuccinonitrile, tetrakis-(trifluoromethyl)succinonitrile, 1,2-difluoro-1,2-bis(pentafluoroethyl)succinonitrile, 1,2-difluoro-1,2-diphenylsuccinonitrile, 1,2-difluoro-1,2-bis(trifluoromethyl)succinonitrile, 1,2-difluoro-1,2-di-tert-butylsuccinonitrile, tetramethylsuccinonitrile and so forth.

A particularly preferred group of monomers for the present process, wherein three carbon atoms intervene between the two nitrile groups of the monomer, include, for example, perfluoroglutaronitrile, perfluoro-2-methyl-glutaronitrile, perfluoro-2,2-dimethylglutaronitrile, perfluoro-2-ethylglutaronitrile, perfluoro-2-isopropylglutaronitrile, perfluoro-2-tert-butylglutaronitrile, perfluoro-1,2,3-trimethyl-glutaronitrile, perfluoro-1,1,3,3-tetramethylglutaronitrile, perfluorohexamethylglutaronitrile, cyclohexane-1,1-bis(difluoroacetonitrile), 2,2-diphenyl-1,1,1,3,3-tetrafluoroglutaronitrile, and so forth.

Still a further class of presently useful monomers, having 4 or more carbon atoms intervening between the nitrile groups, include perfluoroadiponitrile, 2,2,3,3-tetramethyl-1,1,4,4-tetrafluoroadiponitrile, perfluoro-2,3-dimethyladiponitrile, perfluoro-1,4-dimethyladiponitrile, cyclohexane-1,2-bis(difluoroacetonitrile), perfluoropimelonitrile, perfluorosuberonitrile, perfluorosebaconitrile, perfluorododecanedinitrile, perfluorotetradecanedinitrile, and so forth.

OTHER NITRILES

The heterogeneous catalysis high pressure method of this invention is also applicable to the conversion of other organic mono- and dinitriles to oligomers and polymers. The organic radical attached to the nitrile group need not be hydrocarbon; it may be substituted, for example, by halogen atoms such as chlorine. For example, there may be aliphatic mononitriles such as acetonitrile, propionitrile, butyronitrile, isobutyronitrile, n-valeronitrile, phenylacetonitrile, ethyl cyanoacetate, fluoroacetonitrile, chloroacetonitrile, trifluoroacetonitrile, perfluorobutyronitrile, perfluoroheptanonitrile, α,α-dichloropropionitrile cyclohexanecarbonitrile, cyclohexylacetonitrile, 3-cyclopentylpropionitrile and the like; and aromatic nitriles such as benzonitrile, o-tolunitrile, m-tolunitrile, p-tolunitrile, 2-naphthonitrile, phenylbenzonitrile, p-t-butylbenzonitrile, p-chlorobenzonitrile, m-fluorobenzonitrile, 3,4-dichlorobenzonitrile, p-chlorobenzonitrile and the like.

Dinitriles having alpha hydrogen atoms can also be converted by the heterogeneous catalysis method of this invention to oligomers and polymers. Examples of these are malononitrile, succinonitrile, glutaronitrile, adiponitrile, pimelonitrile, suberonitrile, sebaconitrile, 2-bromomalonitrile, 3,3-difluoroglutaronitrile, 3,3-dichloroglutaronitrille, ethyl 3-cyano-2-(cyanomethyl)propionate, 3-phenylglutaronitrile, p-phenylenebis(acetonitrile) and the like,

CATALYSTS

Referring to the catalyst which is employed in conducting the method of the invention, where this is a base, it should be a moderately strongly basic catalyst. Particularly preferred basic catalysts are nitrogenous bases containing hydrogen as a nitrogen substituent, such as ammonia, dimethylamine, dipropylamine, methylethylamine, diethylamine, ethylamine and the like. In conducting the condensation of the nitriles with heterogeneous catalysis, solid catalytic substrates of various kinds may be employed. Graphite, which has a layer lattice structure, is an excellent catalyst for the high pressure polymerization of both mono- and dinitriles, and is advantageous for reasons as set forth above, in that it is insoluble, facilitating the separation of oligomers from the reaction mixture, and it has lubricant, heat conductive, and electrically conductive properties which contribute desirable properties to high polymer products produced with the graphite as catalyst.

The polymerization of dinitriles at high pressures to produce high polymers can also be catalyzed by metal halides and metal cyanocoordination compounds. Some of these have the property of catalyzing polymerization effectively at low pressures. Thus, certain metal halides are low pressure catalysts: nickel chloride and copper (I) chloride are especially active; beryllium chloride and bismuth oxychloride are also effective. Additionally, the low pressure catalysis can be accomplished with metal cyanocoordination compounds, including copper phthalocyanine, Prussian blue (FeK.Fe(CN)$_6$) and silver cyanide. Utilization of other such coordination compounds, such as nickel, cadmium and zinc phthalocyanines, as catalysts is also contemplated by this invention.

As discussed hereinafter, the novel products of this invention may comprise polymers filled with noncatalytic fillers. The fillers contemplated in this connection include particularly solid lubricant materials such as cadmium chloride, lead iodide and the like. Not all metal halides are good catalysts for the heterogeneous catalysis of polymerization, at least at the low pressures at which the above-mentioned catalytic metal haliden are effective. Thus for example, lead iodide, zinc chloride, cadmium chloride and copper cyanide are less active at low pressures than the catalysts named above. Indeed, among metal cyanocompounds, the ionic cyanides such as Li, Na, K and Hg cyanides are apparently noncatalytic, in contrast to the coordination compounds named above. It has been found, however, that the stated catalytic compounds can be used to polymerize a dinitrile at low pressure in the presence of a filler material such as CdI$_2$, PbI$_2$ or the like, which is not itself a good catalyst of the polymerization. Accordingly, the utilization of heterogeneous catalysis in accordance with this invention to polymerize dinitriles in the presence of "inert" fillers (that is, filler materials such as solid lubricants which are less active or inactive as polymerization catalysts) is also contemplated by this invention.

CONVERSION CONDITIONS

In conducting the conversion of nitriles to oligomers and higher polymers in accordance with the present invention, they will be compressed and heated in the presence of the catalyst. For heterogeneous catalysis at close to atmospheric (autogenous) pressures, the temperatures required are usually above about 100° C., and advantageously, 150° C. and above; usually it is not necessary to go above 200° C. For base or heterogeneous catalysis requiring high pressure, generally temperatures above about 200° C. are required. The conversion is accelerated by elevating the temperature, and frequently for practicable reaction rates at reasonably low pressures, temperatures of 250° C. and above will be employed. The temperatures employed may range up to below the decomposition temperature of the components of the reaction mixture.

The amounts of basic catalysts employed will be preferably low, such as 0.1 mole per mole of nitrile monomer and preferably still less, such as 0.0002 mole per mole. As noted above, at very low concentrations the rate of polymerization varies proportionally with the amount of catalyst. When a solid catalyst is used in heterogeneous catalysis, the amount employed may be as low as the stated amount, or may be much higher, up to a weight equal to that of the monomer or more. Generally the reaction mixture will consist essentially of the nitrile and catalyst, although the presence of solvents is not excluded, particularly solvents having an ionic catalytic effect such as pyridine and methanol. Either individual nitriles or mixtures of nitriles may be employed in the reaction mixtures: the oligomeric triazine products and high polymers can be mixtures of nitriles may be employed in the reaction mixtures: the oligomeric triazine products and high polymers can be products of individual mono- or dinitriles or of mixtures thereof.

During the conversion, a decrease in volume of the reaction mass generally evidences the occurrence of conversion. The reaction will be continued until the desired degree of conversion has been reached.

The present catalyzed polymerization forming high polymers appears to proceed in a regular, gradual fashion. The viscosity of the catalyst-containing reaction mixture increases steadily: at the early stages, the product is a thick liquid, later it is a flexible and soft solid, and as exposure to the polymerization conditions is continued, a tough and rigid polymeric product is produced. When exposure to high pressure polymerizing conditions is continued beyond this stage, the product obtained, which is presumably highly crosslinked, tends to be brittle and frangible. Optimum times for the duration of exposure to polymerizing conditions depend on factors such as temperatures and pressure: as these are increased, the time required to form a tough and rigid polymer decreases.

Pressures applied in conducting catalyzed polymerizations in accordance with this invention will vary, depending on the catalyst. With base catalysis the pressure will be at least about 5,000 kg./sq. cm.: at much lower pressures, bane-catalyzed polymerization is extremely slow, even at high temperatures, and the product differs from that obtained with base catalysis at high pressures. Heterogeneous catalysis with the more active of the present metal salt catalysts produces polymerization at reasonable rates under autogenous pressure in closed vessels at temperatures below 200° C., and the products appear to be like those obtained at above 5,000 kg./sq. cm. Increasing the pressure accelerates polymerization in the presence of heterogeneous catalysis, and if desired, the present heterogeneous catalysis polymerization method may be conducted at pressures above autogenous pressures, extending up into the 5,000–25,000 kg./sq. cm. high pressure range.

As noted above, the pressure applied may affect the nature of the high polymer products resulting. This is particularly evident in the case of base catalysis, where the atmospheric autogenous pressure product is different from that produced at 5,000 kg./sq. cm. and above. Pressures from 5,000 kg./sq. cm. to about 15,000 kg./sq. cm. produce generally similar products: the perfluoroglutaronitrile polymers produced at 280° C. in 1 hour over this range of pressures, for example, are each black, tough similar materials. When the pressure is increased to between 15,000 and 25,000 kg./sq. cm., however, a qualitative change in the product is observed: the high polymer produced from an alkylene dinitrile free of alpha hydrogen atoms is still a tough polymer with lubricant properties, but it is not black, but rather clear and transparent, and light amber in color.

When polymerization in the range of 5,000–15,000 kg./sq. cm. is not taken to the completely rigid stage, but is stopped at some stage up to the tough resilient state, further polymerization is possible. When the polymer is ground and wetted with monomer, and the mixture is placed under the catalyzed high pressure, high temperature polymerization conditions, the product is a coherent solid block of polymer. This procedure provides a convenient means for molding the polymers to desired shapes and forms. However, further polymerization does not change the nature of the polymer. When black polymer prepared in the 5,000–15,000 kg./sq. cm. range is heated at 20,000 kg./sq. cm. in the presence of monomer, while the monomer is converted to the clear and transparent polymer produced at such elevated pressures the black polymer retains its dark color and opaque character.

ANTIFRICTION ELEMENTS

As discussed above, the perfluorinated dinitrile polymers provided by this invention are advantageously employed as antifriction elements of drive trains. These may take the form of gears, bearings or like elements subject to frictional contact in relative movement to other mechanical elements. These polymers can be applied to performed structures of the stated nature as a surface coating, as a tape covering, or as impregnation extending to the surface; for example, they may impregnate sintered copper, porous bronze or the like. Also, elements may be constructed entirely of the polymer. The perfluorinated dinitrile polymers can sometimes advantageously be filled, in this application, with solid lubricant materials. Graphite is especially preferred, for its catalytic activity during preparation of the polymers; other solid lubricant fillers catalytic or not, such as molybdenum disulfide, lead oxide, $CdCl_2$, $CdI_2$, $PdI_2$, $AgCl$, $Ag_2SO_4$, $Cu_2Br_2$, $WS_2$, $CaF_2$, $PbI_2$, $PbF_2$, and soft metals like gold, silver, and the like may also be employed. Various other fillers can also be employed to improve resistance to cold flow and high temperature deformation under load, and to reduce wear rates, such as glass fibers, milled glass, coke flour, asbestos, mica, bronze, copper, lead, aluminum silicate ceramic fibers, titanium dioxide, zirconium oxide, calcium fluoride, and the like.

The invention is illustrated but not limited by the following examples.

EXAMPLE 1

This example relates to preparation of pure perfluoroglutaronitrile.

A slurry of 100 grams (g.) (0.42 mole) of finely powdered commercial perfluoroglutaramide in trichlorobenzene is added over 2 hours to a mixture of 125 milliliters (ml.) of trichlorobenzene, 475 ml. (3.33 mole) of benzotrichloride and 7.5 g. of zinc chloride, kept at 205–210° C. After completion of the addition, the reaction mixture is heated for another hour. The exit gases are cooled by a spiral condenser attached to the distilling head of the flask containing the reaction mixture, and the gases are further cooled by a water/ice trap followed by a series of solid carbon dioxide cooled traps. Distillation of the condensate in the lower temperature traps at atmospheric pressure gives 36.6 g. of perfluoroglutaronitrile, $b$ 38° C. Perfluoroglutaryl chloride produced as a byproduct in the reaction and recovered in the first trap is treated with anhydrous ammonia and the product added to the system, to provide an additional 7.4 g. of crude perfluoroglutaronitrile.

Vigorous purification of the perfluoroglutaronitrile is accomplished by shaking with cold 10 percent potassium hydroxide solution and then drying over anhydrous sodium sulfate. This gives 24 g. of perfluoroglutaronitrile as a clear colorless liquid, 99.95 percent pure by vapor phase chromatography. Infrared spectra show the complete absence of CH, amide or acid chloride bands.

EXAMPLE 2

This example describes polymerization of perfluoroglutaronitrile under high pressure.

The bomb used for the polymerization is one useful for the pressure range up to 10,000 kg./sq. cm. It is 0.75 inch I.D., 3 inch O.D., 4 inch long, and provided with Bridgman leakproof closures. Heating is accomplished by means of an electrically heated jacket around the bomb. A dial gauge measures relative motion of the upper piston with respect to the lower plug, giving a measure of the volume changes during compression and chemical reaction. The bomb and plugs are made of red hard tool steel, heat treated for maximum toughness, with a Rockwell C hardness number of 53–54.

The dinitrile monomer is charged into the cavity within the bomb, between the piston and the plug, as a free liquid or in a container, which may be, conveniently, a lead capsule crimped shut to contain the liquid monomer. Free space in the bomb cavity is filled with oil.

The bomb is charged with 6.15 g. of highly purified perfluoroglutaronitrile, freshly prepared as described in Example 1, to which a trace of ammonia gas has been added. The nitrile is enclosed in a lead capsule weighing 5.55 g. and the bomb filled with oil. The bomb is brought up to 7,600 kg./sq. cm. and 230° C. over a period of an hour, and then held under these conditions. A volume decrease is observed, which ceases after 12 minutes. Heating is discontinued, and after the bomb has cooled, the pressure is released. The contents are found to be a tough brown pliable solid, with a little sticky liquid in the bottom of the lead capsule. The solid does not melt on a hotplate, and is solid, high molecular weight polymeric perfluoroglutaronitrile. The liquid portion is a lower molecular weight polymer: its infrared spectrum shows that most of the CN groups in this material are in the form of $-C=N-$ groups, with a minor amount in the form of $-C=N$ groups.

When the same highly purified, freshly prepared perfluoroglutaronitrile is put into the bomb similarly, but without prior addition of ammonia, and held at 7,600 kg./sq. cm. and 230° C. for 30 minutes, the product is a limpid liquid, and no appearance of polymeric material occurs.

EXAMPLE 3

This example describes another polymerization of perfluoroglutaronitrile, with a different catalyst.

The synthesis of perfluoroglutaronitrile described in Example 1 is modified by eliminating the drastic purification step. After the liquid in the carbon-dioxide-cooled traps has been brought up to ice water temperature, it is transferred to a vessel in which it stands over anhydrous sodium carbonate overnight. Distillation of the liquid after filtration gives the perfluoroglutaronitrile as a colorless liquid, $b$ 38° C., which is 99.95 percent pure according to vapor phase chromatography.

Diethylamine is employed as a catalyst, at molar amine-to-nitrile ratios of $1:1.2\times10^8$, $1:1.5\times10^8$ and $1:5\times10^8$. The products, after exposure to the 250° C./7,600 kg./sq. cm. conditions in the manner described above, are respectively an orange mobile liquid, a red-brown viscous liquid, and a thick molasseslike syrup. These prepolymers are moderately soluble in acetonitrile, dimethylformamide and dimethylacetamide as well as in monomeric perfluoroglutaronitrile. Evaporation of the solvents leaves a film on glass. Infrared spectra show the change of absorption from monomer to the three prepolymers. The principal changes are the decrease of intensity of the $-C=N$ band at 2,250 cm.[11] and the increase of intensity of the bands at 1,665 and 1,550 cm.[11]. Other absorption bands remain undisturbed until the condensation reaches the rigid polymer stage, when most structural features become indistinct.

EXAMPLE 4

This example describes preparation and testing of the perfluoroglutaronitrile polymer as a bearing material.

Seven grams of perfluoroglutaronitrile are put in a lead capsule and 1.5 cc. of nitrogen saturated with diethylamine vapor is bubbled through the liquid monomer. The capsule is crimped shut and put in the bomb which is filled with oil and heated to 270° under a pressure of 7,600 kg./sq. cm. Temperature and pressure are maintained for the 27 minutes during which a volume decrease is observed. The pressure and temperature are then let down and the capsule pushed out and cleaned. When the capsule is cut open, the bottom part is found to contain soft sticky polymer and the top, tough solid polymer. The soft material is soluble in acetonitrile, and ultraviolet spectral analysis of the acetonitrile solution shows broad peaks in the 255–260 $z$ absorption range.

The above-described procedure is repeated using 7 g. of perfluoroglutaronitrile, and maintaining the capsule at 260–270°C. under 7,600 kg./sq. cm. pressure for 1.5 hours. The the pressure and temperature are let down and the capsule recovered. It contains a thick sticky mass, some parts of which are rubbery.

This material and the previous product are put into the high pressure apparatus with about 0.2 g. of monomeric perfluoroglutaronitrile. After the monomer has soaked into the low polymers overnight, the mass is held at temperatures of 264–275°under 7,500 kg./sq. cm. pressure for 1.25 hours. A solid piece of polymeric product is obtained weighing 11.5 g. The density of the polymer is measured as about 1.84 g./sq. cm.

From the solid piece of polymer, a cylinder three-fourths inches in diameter and 12 mm. thick is sawed off. The cylinder is mounted in a holder and machined to cut out a ½-inch radius circle from the lower part. The cylinder is mounted in a weighted holder and the assembly is mounted on a 1 inch diameter hardened steel hub on the shaft of a 1,725 r.p.m. ¼-horsepower electric motor, with the concave surface of the cylinder bearing against the steel hub. The weight of the assembly with the cylinder is 1,100 g. and the bearing pressure of the cylinder against the steel hub of the test equipment is 770 g./sq. cm. The motor is started up and the shaft rotated against the cylinder for 2 hours. At the end of this time, the temperature of the steel hub against the polymer has levelled off at 73° C., and the weight loss of the polymer is 0.0038 g., indicating that the polymer has a low coefficient of friction and is a good bearing material.

EXAMPLE 5

This example illustrates polymerization of a nitrile high polymer by heterogeneous catalysis.

Five g. of powdered graphite is outgassed at 220° C. and $10^{13}$ mm. for an hour. It is then cooled, 25 ml. of perfluoroflutaronitrile is added to it, and the mixture is exposed to 250–270°C. under 7,600 kg./sq. cm. pressure. Condensation is complete in 10 minutes.

The charge is pushed out, and the top part, weighing 3.71 g., is cut off. It is a strong, hard solid which can be cut with a knife with great difficulty.

The 3.1 g. piece is shaped into a smooth disc about 5 mm. thick and ¾-inches in diameter. The resistivity of this sample is determined, by touching probes to it at a distance of about 1 cm. apart, to be 70 ohms. The density of the product is about 2.0 g./cm.$^3$.

Unlike polytetrafluoroethylene filled with graphite, this graphite-filled polyperfluoroglutaronitrile does not lose its stiffness at elevated temperatures.

EXAMPLE 6

This example illustrates mixed heterogeneous and basic catalysis of nitrile polymerization.

The bottom, 6.7 g., portion of the graphite-catalyzed, perfluoroglutaronitrile polymer made as described in example 5 is chopped up in small pieces, mixed with solid carbon dioxide, run through a small Wiley mill with 60 mesh screen, and dried in high vacuum at 100° C. The weight recovered is 6.2 g. The polymeric material thus produced is placed in the bomb, and 5 g. of perfluoroglutaronitrile treated with 3 ml. of air saturated with diethyl amine vapor is poured into the bomb and mixed with the powdered polymer. The bomb is closed and sealed, and the mixture let stand overnight to allow the monomer to swell the polymer particles.

The reaction mixture is now heated while pressure is applied: it takes 1 hour to bring the reactor up to 220° C. with the pressure gradually rising, and then it is held at 7,000 kg./sq. cm. and 240–270° for an hour. The product adheres to the capsule walls, and cannot be pushed out with 16 tons force, but upon reheating the reactor to 140° the cylinder of black, well-formed polymer now pushes out easily. It is then heated in a vacuum of $10^{13}$ mm. at 120° to remove any monomer.

Irregularities at the end of the cylinder are smoothed off with sandpaper to give smooth ends and this cylinder is then touched with probes about 1 cm. apart. The resistance measured is 5,000 ohms.

To measure the antifriction properties of this product, the stated disc is placed in a brass holder and on one side machined to a concave cylindrical surface of radius 0.5 inches. This is then mounted, in the brass holder, on a 1 inch diameter hardened steel hub in the shaft of a 1,725 r.p.m., ¼-horsepower electric motor, as described in the preceding example. The total weight of the brass holder and graphite-filled polymer is 68.7 g., and the surface area of contact of the polymer and the steel hub, 1.68 sq. cm. Thus the total force on the bearings surface between the polymer and the steel shaft is 1,100 g.

The motor is now started, so that the steel shaft rotates at 1,725 r.p.m. under the 1,100 g. load against the graphite-filled perfluoroglutaronitrile polymer, while the temperature of the system is measured. After 2.25 hours, the temperature of the steel hub is 63° C. Thus the heat developed by friction is low.

The bearing load assembly is now modified by adding a 500 g. weight to each end of a bar mounted across the brass holder, increasing the load to 2,100 g. and giving a bearing pressure of 1,250 g./sq. cm. The motor is again started at 1,725 r.p.m. and the assembly let run for 2 hours. At the end of this time the temperature of the steel shaft is 98.5° C. and the weight loss of the polymer, 5.8 mg.

This sample is about 62 volume-percent polymer and 38 volume-percent graphite.

EXAMPLE 7

This example illustrates another heterogeneous catalysis of dinitrile polymerization.

Three grams of graphite, outgassed at $10^{13}$ mm. at 220° C., and 8 g. of perfluoroglutaronitrile are combined by vaporizing the perfluoroglutaronitrile into the graphite and condensing it on the graphite. Pressures of about 7,600 kg./sq. cm. and temperatures of about 250° C. are applied to the mixture for about an hour. After cooling, the contents of the bomb are pushed out in one piece.

The polymer has a density of 2.012. The density of graphite is 2.26 and that of the pure polymer of the nitrile, about 1.83: thus the product is 58 volume-percent polymer and 42 volume-percent graphite.

EXAMPLE 8

This example illustrates heterogeneous catalysis of mononitrile condensation.

Acetonitrile is combined with graphite in the ratio of 40 parts by weight graphite to 100 parts acetonitrile. At 275–295° C. and 7,600 kg./sq. cm. pressure, the condensation is complete in 15 minutes to give a quantitative yield of 4-amino-2,6-dimethylpyrimidine.

EXAMPLE 9

This example illustrates conversion of a dinitrile to polymer under varying conditions.

A masterbatch of pure perfluoroglutaronitrile combined with 0.0435 mole-percent diethylamine is prepared, and samples of this mixture are heated under varying pressures to provide solid polymeric products.

The product of heating at 7,250 kg./sq. cm. and 280° C. for 1 hour is a black, tough slightly rubbery solid, $d$ 1.8361 g./cm.$^3$. The resulting polymer shows sharp infrared bands at 790 and 1,560 cm.$^{11}$ that are not present in the spectrum of the monomeric nitrile. The ratio of the optical densities of the 1,560 cm.$^{11}$ band to that of the 790 cm.$^{11}$ band is 2.2.

When a sample of the same catalyzed monomer is polymerized at 7,250 kg./sq. cm. and 265° C. for 1 hour, it is incompletely polymerized and is a dark brown sticky liquid.

The product of heating at 15,500 kg./sq. cm. at 280° C. for 1 hour is a dark amber tough solid, $d$ 1.8337 g./cm.$^3$ with sharp infrared bands at 790 and 1,560 cm.$^{11}$. For this polymer, the optical density ratio of the 1,560 cm.$^{11}$ band to that of the 790 cm.$^{11}$ band is 2.3.

A sample of the amine-containing dinitrile monomer is heated at 280° C. for 1 hour under 20,000 kg./sq. cm. pressure. A steady volume decrease is observed for 20 minutes of this time. The product is a clear, transparent, light amber-colored, solid, tough polymer, with a density of 1.8500. For this polymer, the 1,560 cm.$^{11}$/790 cm.$^{11}$ band ratio is 1.8.

A cylindrical piece of the black polymer made as described above, by exposure of the amine-containing perfluoroglutaronitrile monomer to 7,250 kg./sq. cm. and 280° C. for 1 hour, is placed in a lead capsule and surrounded by a sample of the amine-containing perfluoroglutaronitrile monomer. The lead capsule is covered and enclosed in a copper container, and the assembly is held at 20,000 kg./sq. cm. and 280° C. for 1 hour. The monomer is polymerized to a transparent light-colored polymer, while the black polymer remains unchanged: the product is a cylinder in which an outer layer of transparent polymer concentrically surrounds a center cylinder of black polymer.

A sample of the amine-containing perfluoroglutaronitrile maintained for 1 hour at example 280° C. and 24,000 kg./sq. cm. is polymerized to a polymer which is transparent but brittle.

EXAMPLE 10

This example illustrates properties of basic catalyzed dinitrile polymers.

For comparison purposes, a sample of several grams of the masterbatch described in example 9, consisting of perfluoroglutaronitrile containing a catalytic amount of diethylamine, is placed in a glass ampul which is evacuated and sealed. The tube is heated until polymer is produced at autogenous pressure, on a schedule as follows:

118° C., 16 hours; 150° C., 93 hours; 196° C., 16 hours; 220° C., 22 hours; 240° C., 7 hours; 250° C., 184 hours; 270° C., 17 hours;

for a total of 355 hours. The product is a dark brown tough polymer with a density of 1.807 g./cc.

This is compared with a second sample of the masterbatch, condensed to a black solid polymer in accordance with this invention at 7,600 kg./sq. cm. and 280° C. as described in example 9.

Nuclear magnetic resonance measurements are made at room temperature at a radiofrequency of 40.0 mc./sec. and a magnetic field of 10,000 gauss. In all cases, the r–f field is below the saturation recorded as the first derivative of the absorption lines. The spectrum of the polymer prepared at autogenous pressure shows two lines for the polymer. The spectrum of the 7,600 kg./sq. cm. polymer shows only a single very wide line. The numerical data are as follows:

| Pressure of Condensation | Line Width, gauss | Chemical Shift, p.p.m. |
|---|---|---|
| autogenous | A. 0.04 | +49 |
|  | B. 0.04 | +31 |
| 7,600 kg./sq. cm. | 5.55 | ca. 0 |

Because of the sharpness of the lines, one can observe two types of environment for the fluorine atoms in the autogenous pressure polymer. The higher field resonance, +49 p.p.m., is believed related to the inner $-CF_2-$ in the $-CF_2CF_2CF_2-$ system, while the lower field signal, +31 p.p.m., arises from the outer $-CF_2-$ groups. These results show that the polymer is behaving like a pseudoliquid rather than a rigid solid. In this polymer segmental motions or group rotations are freely possible. Indeed, the polymer feels somewhat rubbery.

Electron paramagnetic resonance (EPR) measurements are performed on the autogenous pressure polymer, the black 7,600 kg./sq. cm. polymer and the clear, light yellow 20,000 kg./sq. cm. polymer prepared as described in example 7. Spectra are recorded using 100 kc. magnetic modulation. No signal is obtained with the autogenous pressure polymer or the 20,000 kg./sq. cm. polymer. The polymer made at 7,600 kg./sq. cm. gives a moderate to strong E.P.R. signal with a $g$-value of 2.0040±0.0004 compared to 2.0036 for a sample of 1,1-diphenyl-2-picrylhydrazyl. Thus, the $g$ value for the polymer is very close to that for a free electron (2.0023) and the relatively narrow line and Lorentian line shape suggest that the unpaired electron is in a stable free radical system.

In studies of the reactivity of the present polymers with fluorine compounds, very thin shavings of the black, 7,600 kg./sq. cm. polymer are treated with gaseous fluorine at 100° C. They are bleached in 30 minutes, but no other effect is noticed. Solid chunks of the polymer are completely inert to gaseous fluorine at 100° C. In liquid fluorine (−191° C.), no reaction or change of weight occurs in 70 hours. The polymer is also found to be inert to a liquid fluorine-oxygen mixture. Exposure of the polymer to gaseous $ClF_3$ is not observed to have any effect on it. When the polymer is submerged in liquid $ClF_3$ at −20° C. for 68 hours, it increases in weight as a result of absorption of the $ClF_3$. The infrared spectra of the polymer samples after the above treatments (and out-gassing to remove the absorbed $ClF_3$) are identical with that of the starting material.

EXAMPLE 11

Perfluoroglutaronitrile containing diethylamine as described in example 9 is mixed with molybdenum disulfide in a weight ratio of 3:1, respectively, and 10 g. of the mixture is heated at 270° C. under a pressure of about 7,500 kg./sq. cm. The product, which is a solid, filled polymer, is ground in a mill, moistened with 0.4 g. of monomeric perfluoroglutaronitrile, and remolded at about the same temperature and pressure, to produce a solid cylindrical block of filled polymer. Repetition of the stated procedure again produces condensation of the dinitrile to a solid filled polymer.

The stated procedure is followed again, but substituting graphite for the molybdenum sulfide. The initial sample is 10 g., containing about 3.5 g. graphite, and 6.5 g. perfluoroglutaronitrile. The solid product of the first heating at about 7,500 kg./sq. cm. is ground to disperse the graphite uniformly, moistened with monomeric perfluoroglutaronitrile, and remolded at the same temperature and pressure.

Cylinders of the polymer produced by heating and compressing perfluoroglutaronitrile containing diethylamine without added solid filler under the stated conditions are also prepared.

Rectangular 0.62×0.40×0.25 inch standard Rub Block specimens, with end thermocouple holes, are machined from duplicate cylinders of the unfilled polymer ($Et_2NH$ catalyst), the polymer filled with graphite, and the polymer filled with $MoS_2$, prepared as above stated, and these are tested in a high temperature, high vacuum wear tester for friction against steel, with the following results:

| | Load, lb. | Temp., °F. | Vac., torr | Friction coefficient | | R.p.m. | Total revolutions |
|---|---|---|---|---|---|---|---|
| | | | | Start | Finish | | |
| Pure polymer | 10 | 500 | 6×10⁻⁶ | 0.218 | 0.075 | 600 | 200,000 |
| Graphite filled | 10 | 500 | 7×10⁻⁶ | 0.175 | 0.170 | 600 | 100,000 |
| MoS₂ filled | 10 | 500 | 5×10⁻⁶ | 0.025 | 0.075 | 600 | 50,950 |

These results show that the pure, unfilled polymer has a coefficient of friction against steel that is as low as that of polytetrafluoroethylene when run at 500° F. under a load of about 100 p.s.i. at 600 r.p.m. The load is calculated here from the given load divided by the final area of contact. It is far higher at the start of the test. The pure polymer is only slightly deformed and the polymers filled with graphite and with molybdenum sulfide are even more rigid.

EXAMPLE 12

This example illustrates heterogeneous catalysis of dinitrile polymerization at high pressures by a metal salt.

In a high pressure polymerization, perfluoroglutaronitrile is combined with silver cyanide, and the mixture is heated and compressed in apparatus as described in example 2, to 240° C. at 15,000 kg./sq. cm. Condensation, evidenced by pressure drop, is complete within one-half hour; the product is a solid polymer. By contrast the nitrile alone does not condense when maintained at this temperature and pressure for 1.5 hours.

EXAMPLE 13

This example illustrates heterogeneous catalysis of dinitrile polymerization at pressures close to atmospheric.

A heavy-walled glass ampul (13 mm. O.D. ×8 mm. I.D. ×5 in. long) is connected to a 24/40 ground glass female joint by a 6-inch length of 10-mm. glass tubing. The ampul is filled about half full with solid silver cyanide. The tube system is attached to a vacuum line and evacuated, and then opened to a flask containing liquified perfluoroglutaronitrile, under vacuum. Enough of the perfluoroglutaronitrile to wet the solid completely plus a slight excess is distilled into the ampul, and the ampul is sealed. The ampul is encased in a ¾-inch asbestos-lined pipe, which is immersed in a 180–185° C. oil bath.

Complete condensation occurs in 18 hours at only 188° C. The silver cyanide appears to be insoluble in the nitrile: condensation takes place on the surface of the solid particles. The product is a light-tan, infusible solid whose infrared spectrum is the same as that of the high pressure polymeric product of example 12.

EXAMPLE 14

This example further illustrates heterogeneous catalysis of dinitrile polymerization at pressures close to atmospheric.

The apparatus described in example 13 is employed to contain mixtures of perfluoroglutaronitrile with metal salts as identified below, and the mixtures are heated at 150–180° C. under autogenous pressure until condensation is complete. The products are solid polymers of perfluoroglutaronitrile.

| PFGN, g. | Catalyst, g. | T, °C. | Hours for Complete Condensation |
|---|---|---|---|
| 3.30 | 3.25 PB | 180±2 | 24 |
| 2.05 | 3.25 PB | 150 | 64.5 |
| 4.70 | 1.70 PcCu | 180 | 24 |
| 5.00 | 1.35 PcCu | 180 | 24 |
| 4.00 | 6.80 (90%* $CdI_2$ (10% PcCu | 180 | 30 |
| 3.80 | 6.15 (90%* $PbI_2$ (10% PcCu | 180 | 16 |

PFGN = Perfluoroglutaronitrile
PB = Prussian blue
PcCu = Copper (II) Phthalocyanine
*by weight Following a similar procedure, perfluoroglutaronitrile is heated with metal halides and halogen compounds under autogenous pressure. $NiCl_2$ and $Cu_2Cl_2$ produce complete condensation to a solid polymer in 24 hours; BiOCl produces it in 36 hours. The product of heating perfluoroglutaronitrile with $BeCl_2$ under these conditions for 50 hours is a transparent red rubbery solid; heating 9 days more at 200–240° C. converts this to a darker and harder, but still rubbery product. Zinc chloride and cuprous cyanide similarly produce a reddish, soft rubbery polymer in about 50 hours at 180° C., and $CdCl_2$ also effects partial condensation in 48 hours at 180° C.

Products of the above-described procedures can be employed as antifriction elements of drive trains.

While the invention has been described with particular reference to specific preferred embodiments thereof, it will be appreciated that modifications and variations can be made without departing from the scope of the invention as disclosed herein, which is limited only as indicated in the following claims.

1. The method of polymerizing perfluoroglutaronitrile which comprises heating perfluoroglutaronitrile to temperatures above about 200° C. under a pressure of above about 5,000 kg./sq. cm. in the presence of graphite.

2. The method of polymerizing perfluoroglutaronitrile which comprises heating perfluoroglutaronitrile in a closed vessel with nickel chloride at a temperature of above about 100° C.

3. The method of polymerizing perfluoroglutaronitrile which comprises heating perfluoroglutaronitrile in a closed vessel with copper phthalocyanine at a temperature of above about 100° C.

4. The method of producing oligomers and polymers of nitriles which comprises heating acetonitrile to a temperature above about 200° C. under a pressure of above about 5,000 kg./sq. cm. in the presence of graphite as catalyst.

5. The method of polymerizing perfluoroglutaronitrile which comprises heating perfluoroglutaronitrile to a temperature above about 200° C. under pressure of above about 200° C. under a pressure of above about 5,000 kg./sq. cm. in the presence of a catalytic amount of diethylamine.